US005448453A

United States Patent [19]

Oshio

[11] Patent Number: 5,448,453

[45] Date of Patent: Sep. 5, 1995

[54] VEHICULAR HEADLAMP PROVIDING NEAR-ULTRAVIOLET RADIATION

[75] Inventor: Hirohiko Oshio, Shizuoka, Japan

[73] Assignee: Koito Manufacturing Co., Ltd., Tokyo, Japan

[21] Appl. No.: 289,994

[22] Filed: Aug. 8, 1994

Related U.S. Application Data

[63] Continuation of Ser. No. 18,192, Feb. 16, 1993, abandoned.

[30] Foreign Application Priority Data

Feb. 18, 1992 [JP] Japan .................................. 4-030302

[51] Int. Cl.[6] .......................... B60Q 1/04; F21V 9/00

[52] U.S. Cl. ...................................... 362/61; 362/263; 362/293; 362/328; 362/455

[58] Field of Search ................. 362/61, 261, 293, 304, 362/263, 80, 307, 308, 328, 343, 455

[56] References Cited

U.S. PATENT DOCUMENTS

| | | | |
|---|---|---|---|
| 1,385,429 | 7/1921 | Crockett | 362/304 |
| 4,970,628 | 11/1990 | Bergkvist | 362/61 |
| 5,029,050 | 7/1991 | Bergkvist | 362/61 |
| 5,130,904 | 7/1992 | Ohshio et al. | 362/61 |
| 5,132,881 | 7/1992 | Wakimizu et al. | 362/61 |
| 5,180,218 | 1/1993 | Ohshio | 362/61 |
| 5,188,444 | 2/1993 | Makita et al. | 362/61 |
| 5,220,235 | 6/1993 | Wakimizu et al. | 362/293 |
| 5,255,163 | 10/1993 | Neumann | 362/61 |

FOREIGN PATENT DOCUMENTS

| | | | |
|---|---|---|---|
| 4108008A1 | 9/1991 | Germany . | |
| 4108008 | 9/1991 | Germany | 362/293 |
| 3139943A1 | 7/1992 | Germany . | |
| 4019587A1 | 10/1992 | Germany . | |
| 3641852A1 | 6/1993 | Germany . | |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A vehicular headlamp that provides near-ultraviolet illumination of desired areas but which assures that sufficient brightness can be obtained in areas illuminated with visible light without having to combine the lamp with another type of headlamp. The headlamp includes a light-emitting unit accommodated in a lamp housing including a substantially parabolic reflector, a discharge bulb mounted inside the reflector to generate both visible light components and ultraviolet rays, and a light-emitting lens disposed in front of the reflector to irradiate the light reflected from the reflector in the forward direction. In addition, a bandpass filter adapted to absorptively remove visible light components and permit at least near-ultraviolet rays to pass therethrough is disposed in a light path other than the light path for the low-beam light conducted to the light emitting lens from the reflector so that a low-beam illuminating area is illuminated by both visible light components and near-ultraviolet rays to maintain sufficient brightness in the foregoing region. On the other hand, an illuminating area located above a clear cut line is illuminated mainly by the near-ultraviolet rays.

1 Claim, 2 Drawing Sheets

VEHICULAR HEADLAMP PROVIDING NEAR-ULTRAVIOLET RADIATION

This is a Continuation of application Ser. No. 08/018,192, filed Feb. 16, 1993, abandoned.

BACKGROUND OF THE INVENTION

The present invention relates to a headlamp for a motor vehicle wherein near-ultraviolet rays emitted from a discharge bulb used as a light source are employed to illuminate an area beyond the area lit by the conventional low headlamp beam.

FIG. 4 is a sectional view of a headlamp of the foregoing type. In the drawing, reference numeral 1 designates a lamp body, and reference numeral 2 designates a front lens. A parabolic reflector 3 is arranged in the lamp body 1, a discharge-type bulb 4, e.g., a discharge lamp or the like which irradiates a wide spectrum of ultraviolet rays, is disposed at the focus position of the reflector 3, and a bandpass filter 5 which absorbs visible light components but permits ultraviolet rays to pass is disposed at a predetermined position in front of the reflector 3. With this construction, since the light beam emitted from the headlamp has a strong ultraviolet component since the visible components are absorptively removed by the bandpass filter 5, when the beam strikes an indicator such as certain sign boards or a pedestrian's safety jacket or the like containing, for instance, a fluorophosphor-based substance, fluorescent light is generated therefrom, resulting in the sign, jacket, etc., being easily seen by the driver. When used in combination with a low-beam headlamp emitting visible light, such a sign, jacket, etc., located relatively far ahead of the vehicle can be seen without blinding the driver of an oncoming vehicle, such as would occur if the high-beam headlamp were used.

However, with the conventional headlamp constructed in the above-described manner, since visible light components are absorptively removed by the bandpass filter, the overall brightness is generally insufficient. Thus, there arises a problem that the conventional headlamp must be used in combination with another type of headlamp, e.g., a low-beam headlamp.

SUMMARY OF THE INVENTION

The present invention has been made in consideration of the aforementioned background, and an object thereof resides in providing a headlamp for a motor vehicle which assures that sufficient brightness can be obtained without having to provide a separate headlamp.

To accomplish the above object, according to one aspect of the present invention, there is provided a vehicular headlamp wherein a light-emitting unit including a substantially parabolic reflector, a discharge-type bulb disposed within the reflector to generate both visible light components and ultraviolet rays, and a lens disposed in front of the reflector through which passes the light reflected from the reflector in the forward direction, these components being accommodated in a container-shaped lamp body of which the forward end is open, wherein the headlamp is characterized in that a bandpass filter adapted to absorptively remove visible light components and permit at least near-ultraviolet rays to pass therethrough is disposed in a light path other than the light path along which passes the visible light used to form the low beam.

A front lens may be disposed in front of the reflector to controllably irradiate the light reflected from the reflector in the forward direction, the front lens having a plurality of light-controlling steps formed over the entire surface thereof.

With the invention, the primary area to be illuminated by the low beam contains sufficiently bright visible light components, while areas other than the foregoing primary illuminating area located at comparatively long distances are illuminated by the ultraviolet light which passes through the bandpass filter.

DESCRIPTION OF THE PREFERRED EMBODIMENTS

The present invention will now be described in detail hereinafter with reference to the accompanying drawings, which illustrate two preferred embodiments thereof.

Figure 1:
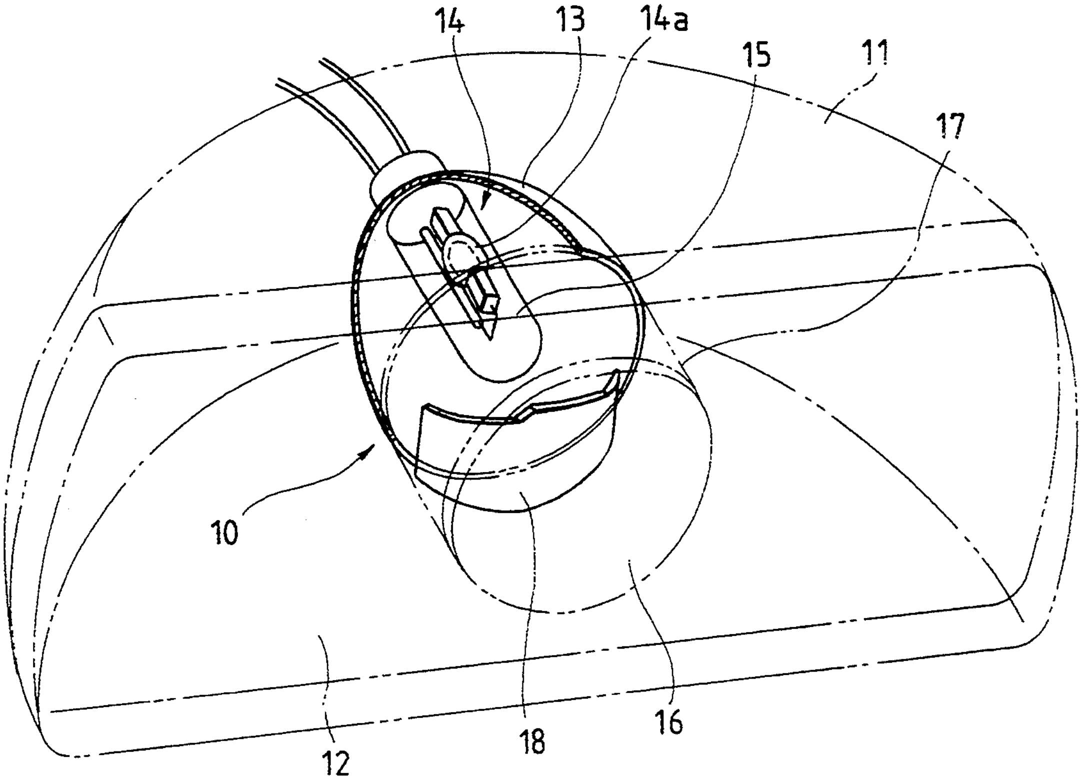
FIG. 1 is a perspective view of a vehicular headlamp constructed according to a first embodiment of the present invention.

FIG. 1 is a perspective view of a vehicular headlamp constructed according to a first embodiment of the present invention.

In this drawing, reference numeral 10 designates a light-emitting unit accommodated in a lamp chamber space defined within a container-shaped lamp body 11, and 12 a transparent front lens (serving also as a cover). The light-emitting unit 10 is constructed in an integrated structure including a substantially parabolic reflector 13 having a discharge bulb 14 mounted therein and a light-emitting lens 14 for directing the light reflected from the reflector 13 in the forward direction. In addition, the light-emitting unit 10 is inclinably supported in the lamp body 11 to allow adjustment of the beam direction by an aiming mechanism (not shown).

Since the light generated by an arc tube 14*a* of the discharge bulb 14 contains ultraviolet rays in addition to visible light components, an ultraviolet ray shielding globe 15 for absorptively removing ultraviolet rays in biologically harmful wavelengths is integrated with the discharge bulb 14 in such a manner as to surround the arc tube 14*a*. Thus, in addition to visible light components, the light emitted from the arc tube 14*a*, i.e., the light emitted from the globe 15, contains near-ultraviolet rays of wavelengths not absorptively removed by the globe 15 but not harmful to health.

A light-emitting lens 16 is fixedly secured to an opening portion located at the forwardmost end of a cylindrical lens holder 17, which in turn is fixedly secured to an opening portion located at the forwardmost end of the reflector 13 by screws (not shown). In FIG. 1, reference numeral 18 designates a bandpass filter for absorptively removing only visible light components. The bandpass filter 18 is arranged in the light emitting unit 10 in a light path separate from the light path for the visible light used to form the headlamp's low beam. Specifically, the bandpass filter 18 is mounted in an upright position in the vicinity of the focus of the light-emitting lens 16 within the range of approximately the lower half of the overall area of the lens holder 17 below the center axis of the latter.

Figure 2:
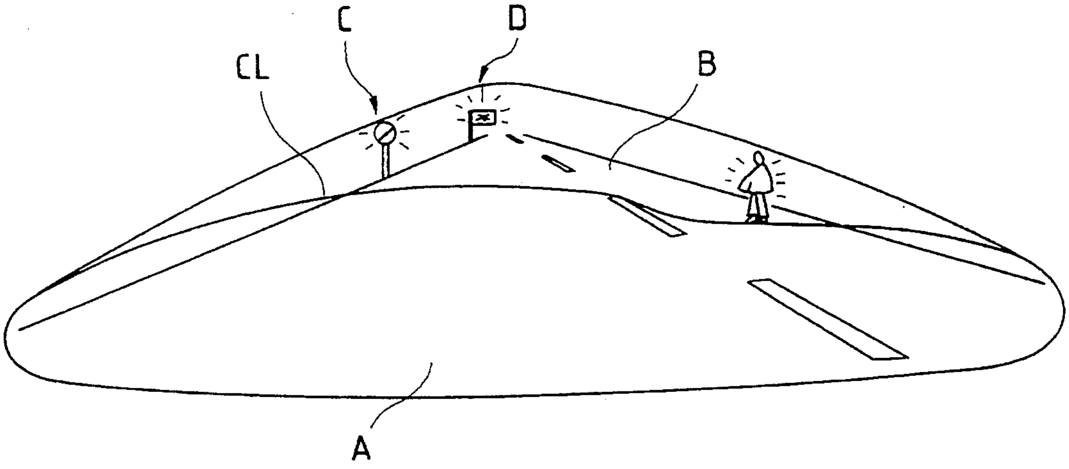
FIG. 2 is a perspective view which schematically illustrates illuminating areas to be illuminated with the headlamp shown in FIG. 2.

With this construction, light generated by the discharge bulb 14 is reflected by the reflector 13, and the reflected light is then irradiated toward the light emitting lens 16. Since some of the reflected light, i.e., visible light used to form the low beam of the headlamp, does not pass through the bandpass filter 18. On the other hand, light which is not used to form the low beam and which does not pass through the bandpass filter 18 contains strong near-ultraviolet components, while the visible light components of this light are absorptively removed by the bandpass filter 18. In addition, the upper edge portion of the bandpass filter 18 is designed with a contour corresponding to a clear-cut line CL for forming the visible low beam (see FIG. 2). Thus, as shown in FIG. 2, light for illuminating an area A to be covered by the low beam of the headlamp contains strong visible light components, resulting in sufficient brightness being obtained with the headlamp. In addition, light for illuminating an illuminating area B (i.e., an illuminating area located above the clear cut line CL) located beyond the low-beam illuminating area A is composed mainly of near-ultraviolet rays containing few visible light components.

Thus, when the foregoing light strikes a road sign or a pedestrian's jacket or the like containing a fluorophosphor-based substance, fluorescent light is emitted, providing a warning to the driver to exercise caution. Since, however, no visible light component is introduced into the illuminating area B, the latter is visually recognized as a dark area compared with the illuminating area A. Consequently, there does not arise a problem that the driver of an oncoming vehicle will be subjected to glare. In FIG. 2, reference characters C and D designate road signs each coated with a fluorophosphor-based substance and which are illuminated by the fluorescent light generated by the fluorophosphor-based substance contained therein.

Figure 3:
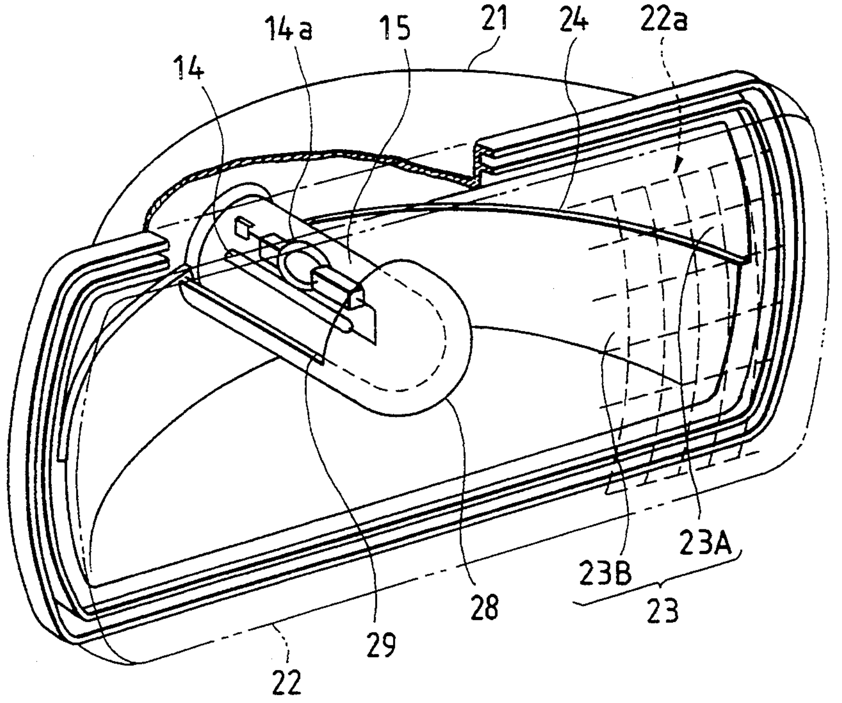
FIG. 3 is a perspective view of a vehicular headlamp constructed according to a second embodiment of the present invention.
Figure 4:
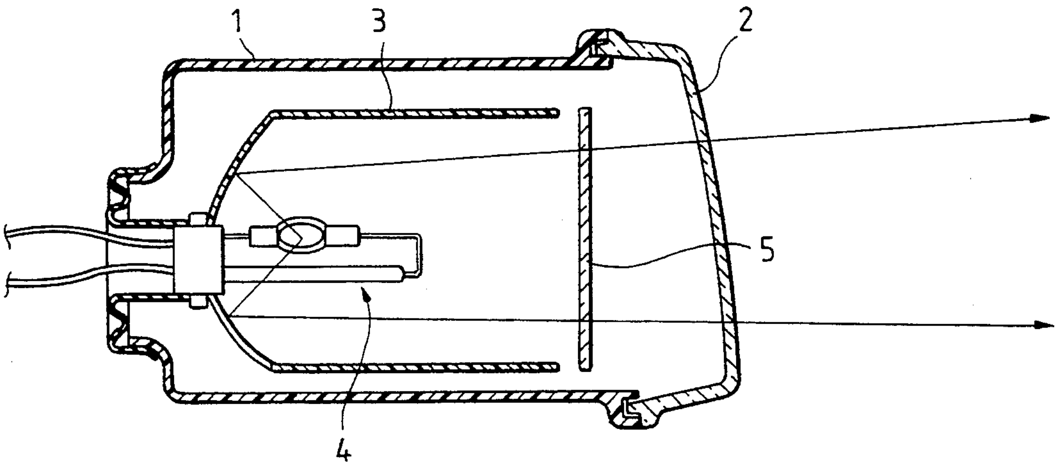
FIG. 4 PRIOR ART
FIG. 4 is a vertical sectional view of a conventional headlamp.

FIG. 3 is a perspective view of a headlamp for a vehicle constructed according to a second embodiment of the present invention.

Although the preceding embodiment has been described above with respect to a direct-illuminating type headlamp for a vehicle, this embodiment is concerned with a reflective-type headlamp for a vehicle wherein the light generated by a discharge bulb 14 is reflected by a parabolic reflector 23 to reform it into a substantially parallel light beam, which in turn is shone in the forward direction so that the substantially parallel light is irradiated in the forward direction via a plurality of light irradiating steps *22a* formed over the entire surface of a front lens 22.

Specifically, the parabolic reflector 23 is molded integrally with a lamp body 21 inside the latter, and an arc tube *14a* of the discharge bulb 14 is located substantially at the focus of the reflector 23 so as to allow the light reflected from the reflector 23 to be reformed to a substantially parallel light beam. The lamp body 21 is supported with the aid of an aiming mechanism on a lamp housing (not shown) mounted on a vehicle body in such a manner that the lamp body 21 can be inclined relative to the vehicle body. An ultraviolet ray shielding globe 15 is disposed over the bulb 14 to surround the arc tube *14a* therewith in order to absorptively remove ultraviolet rays of wavelengths harmful to health.

The reflecting surface of the reflector 23 is composed of an upper reflecting surface 23A (hereinafter referred to as a first reflecting surface) for generating a high beam beam and a lower reflecting surface 23B (hereinafter referred to as a second reflecting surface) for illuminating the region extending along a clear cut line CL, while a stepped part 24 extending from the bulb inserting position in substantially the horizontal direction corresponding to the clear cut line CL is located between the first reflecting surface 23A and the second reflecting surface 23B. Some of the light generated by the bulb 14, i.e., the light reflected from the first reflecting surface 23A, serves to illuminate a passing illuminating area A, while the light reflected from the second reflecting surface 23B serves to illuminate an illuminating area B located above the clear cut line CL (i.e., the region equal to an area calculated by subtracting the passing illuminating area A from a running beam illuminating area).

In the drawing, reference numeral 28 designates a bandpass filter disposed surrounding the arc tube *14a* to absorptively remove visible light components but permit near-ultraviolet rays to pass therethrough. The bandpass filter 28 is designed in such a manner that its forward end part is semispherical and a part of the upper surface is cut out, and a cutout 29 of the filter 28 is located corresponding to the first reflecting surface 23A. Specifically, some of the light generated by the arc tube *14a*, i.e., the light which cannot pass through the bandpass filter 28, is conducted to the first reflecting surface 23A, while light which has passed through the bandpass filter 28 is conducted to the second reflecting surface 23B. With this construction, as shown in FIG. 2, both visible light components and near-ultraviolet rays are irradiated on the illuminating area A, and only near-ultraviolet rays are irradiated on the illuminating area B, in the same manner as the headlamp constructed according to the first embodiment of the present invention.

The second embodiment of the present invention has been described above with respect to a movable-unit type headlamp for a vehicle wherein a lamp body reflector unit, including a lamp body 21 and a reflector 23 arranged inside of the former, is inclinably supported. However, the present invention is not limited to the foregoing type of headlamp. Alternatively, the present invention may equally be applied to a movable-reflector type headlamp wherein a parabolic reflector can be inclined with the aid of an aiming mechanism in a lamp body fixedly mounted on a vehicle body.

As is apparent from the above description, with a headlamp for a vehicle constructed according to the present invention, since a passing illuminating area is illuminated by light which contains strong visible light components but which does not pass through the bandpass filter, sufficient brightness can be obtained with the headlamp. In addition, since an illuminating area other than the passing illuminating area located at a comparatively remote location is illuminated by visible light components which pass through the bandpass filter, no glare is generated which could blind the driver of an oncoming vehicle. Further, since an object or an article containing a fluorophosphor-based substance can easily visually be recognized by a driver of the vehicle having headlamps constructed according to the present invention mounted thereon, it is possible to use the headlamp of the present invention without combining it with another type of headlamp.

What is claimed is:

1. A headlamp for a motor vehicle, comprising:

lamp body;

a light emitting unit mounted within said lamp body, said light-emitting unit comprising a substantially parabolic reflector, a discharge-type bulb mounted within said reflector and generating both visible light components and ultraviolet rays, a projection lens disposed in front of said reflector for directing light reflected from said reflector in a forward direction, and a cylindrical lens holder for holding said projection lens; and a bandpass filter for adsorptively removing visible light components and permitting only near-ultraviolet rays to pass therethrough, said bandpass filter being disposed in a path other than a light path between said reflector and said lens for visible light components illuminating a predetermined low-beam illuminating area forward of said vehicle, disposed such that near-ultraviolet rays passing through said bandpass filter illuminate an area beyond said predetermined area, and mounted in an upright position in the vicinity of a focus of said light-emitting lens within a range of approximately a lower half of an overall area of said lens holder below a center axis of said lens holder, an upper edge portion of said bandpass filter having a contour corresponding to a clear-cut line for an oncoming vehicle.

* * * * *